United States Patent [19]

Haupt

[11] 4,382,613
[45] May 10, 1983

[54] DEFLECTABLE SUPPORT FOR PROTECTIVE FRAME

[75] Inventor: Robert C. Haupt, Wauwatosa, Wis.

[73] Assignee: Allis-Chalmers Corporation, Milwaukee, Wis.

[21] Appl. No.: 219,265

[22] Filed: Dec. 22, 1980

[51] Int. Cl.³ .................... B62D 27/04; B62D 25/00
[52] U.S. Cl. .................................... 280/756; 296/102
[58] Field of Search ...................... 296/102; 280/756; 188/1 C

[56] References Cited

U.S. PATENT DOCUMENTS

| | | | |
|---|---|---|---|
| 3,524,674 | 8/1970 | Mejeiros | 296/102 |
| 3,733,103 | 5/1973 | Hansen | 280/756 |
| 4,023,838 | 5/1977 | Sabec | 296/102 |
| 4,032,187 | 6/1977 | Atherton | 280/756 |

Primary Examiner—Richard A. Bertsch
Attorney, Agent, or Firm—Arthur L. Nelson

[57] ABSTRACT

A deflectable support for a protective frame on a tractor to absorb shock loading on the frame and prevent excessive damage to the frame and provide a secondary support for the protective frame to prevent damage to the frame or injury to the operator.

9 Claims, 4 Drawing Figures

DEFLECTABLE SUPPORT FOR PROTECTIVE FRAME

This invention relates to a protective frame on the vehicle and more particularly to a deflectable support for the frame to absorb energy and to provide a secondary support for the protective frame, particularly for side loading in event of rollover of the vehicle and thereby avoid failure of the frame and assure protection of the operator.

Many of the modern tractors use a resilient mounting for the platform to soften the ride for the operator at the operator station. A protective frame is also used on most tractors which protects the operator in event of vehicle upset. Normally the protective frame is mounted on a part of the vehicle chassis such as the final drive housing or the rear axle housings to securely fasten the frame on the vehicle. Although the protective frame may be integrally mounted with the vehicle chassis, it may also be mounted on the vehicle platform which is resiliently mounted on the vehicle chassis. Mounting the protective frame with the platform requires a certain amount of motion between the chassis and the frame. This may be acceptable, however, to improve the reliability of the rollover frames and not to depend on the resilient isolators solely for carrying the load in event of vehicle upset, a secondary support for the protective frame is used to carry the load of the weight of the tractor per se. Accordingly a more rugged mount is desirable to prevent failure of the protective frame and its mounting as well for protecting the vehicle operator. U.S. Pat. No. 4,032,187 illustrates a protective frame which is mounted to a vehicle chassis such as the rear drive axle housing and has a shock absorbing joint to absorb energy in event of an upset. U.S. Pat. No. 3,733,103 Hansen also shows a device for fastening the rollover bars which are resiliently mounted on a chassis and which is totally isolated from the vehicle chassis. This device provides for a lost motion mechanism between the platform and the vehicle chassis and a lock out in event of vehicle upset. The applicant's invention, however, provides for a limited amount of movement due to the resilient isolators which support the platform on the vehicle chassis. Energy is absorbed by the protective frame in the event of rollovers as it shifts on the resilient isolators and a secondary support consisting of brackets extending inboard to engage the rear drive housing. The secondary support provides a firm support for the protective frame to assure the operator that the protective frame will not fail in providing protection for the operator.

Accordingly, it is an object of this invention to provide a reinforced support to protect the frame mounted on resilient isolators with the vehicle platform.

It is another object of this invention to provide a resiliently mounted platform carrying a protective frame with reinforcing means to provide a secondary support to carry the load on the protective frame due to excessive side loading in the event of vehicle rollover.

It is a further object of this invention to provide a resiliently mounted platform carrying a protective frame. A secondary support is provided with the base supporting the protective frame to reinforce the supporting structure in event of vehicle upset. The secondary supporting structure consists of reinforcing arms which extend inwardly to engage the rear drive housing and prevent failure of the protective frame and its supporting structure and assure protection of the vehicle operator.

The objects of this invention are accomplished on a vehicle having a resiliently mounted platform supported on the vehicle chassis. The protective frame is mounted on the resiliently mounted platform including upright columns extending overhead to protect the operator at the operator station. The secondary support is connected to the base supporting the protective frame and extends inboard to engage the rear drive housing when the protective frame is deformed due to excess side loading or loading responsive to vehicle upset. The secondary support consists essentially of a bracket which is firmly fastened to the base of the support for the protective frame and provides a rigid means engaging the vehicle chassis preventing continued deformation of the protective frame or the resilient isolators supporting the platform and the protective frame. The secondary support locks out against the vehicle chassis and provides a rugged support for the protective frame to assure protection of the operator. In event of vehicle upset the resilient isolators and support for the platform allow an initial deformation of the support and the rollover bars to avoid collapse of the support which consists essentially of resilient isolators under the platform and the protective frame. The secondary support engages the final drive housing to prevent further deformation and to support the load of the vehicle in event of rollover.

Referring to the drawings.

Figure 1:
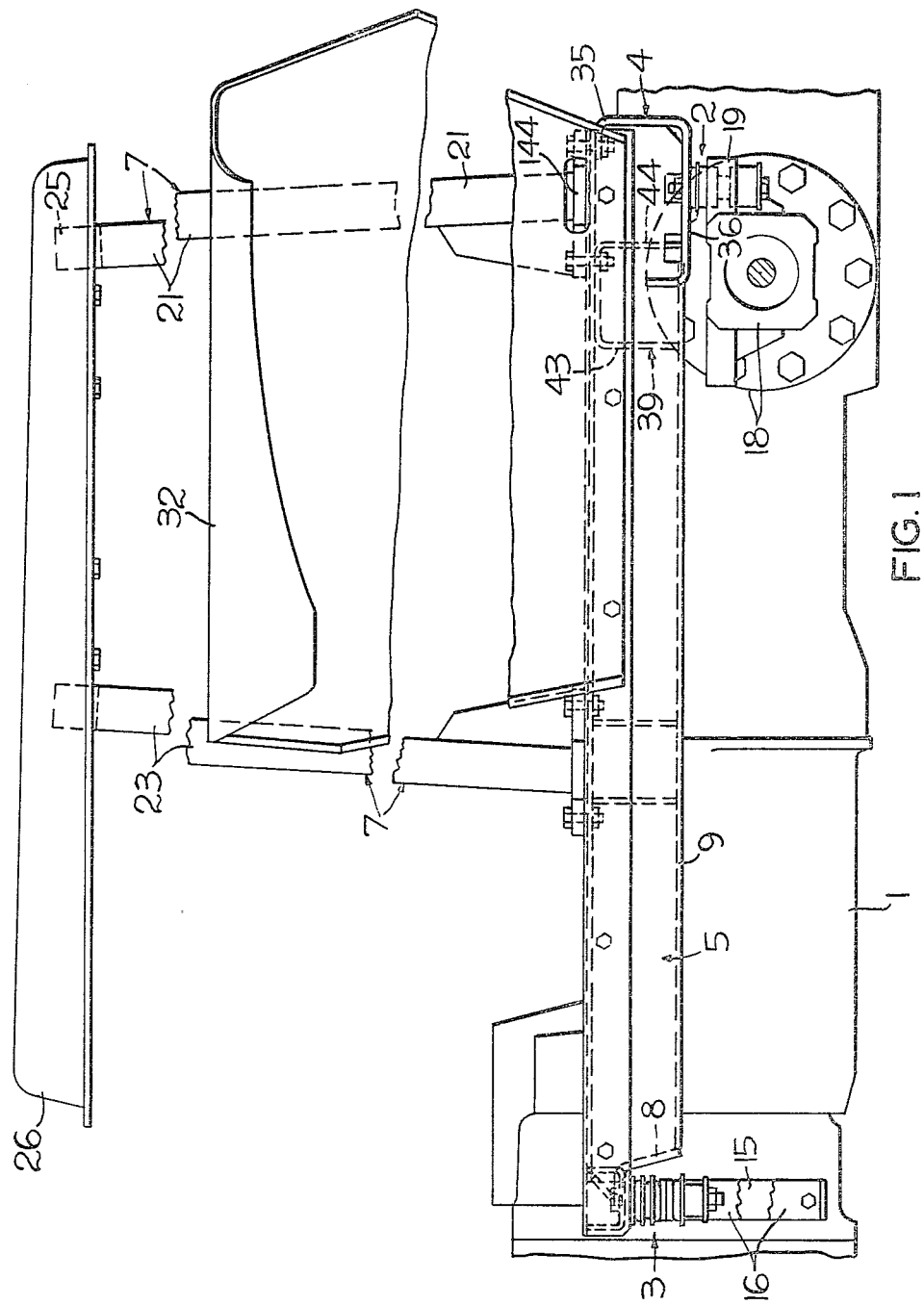
FIG. 1 is a side elevation view of the vehicle platform and protective frame on the vehicle.
Figure 2:
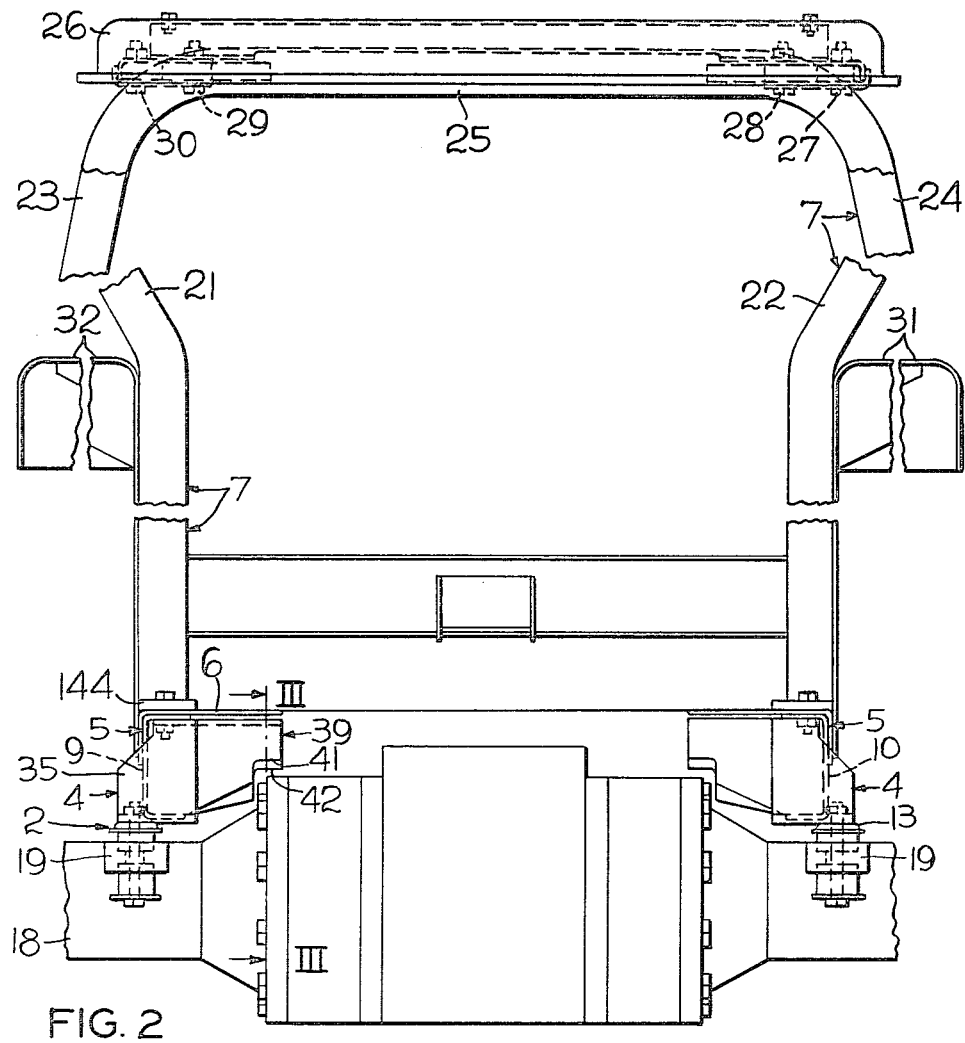
FIG. 2 is a rear view of the platform and protective frame mounted on the vehicle.
Figure 3:
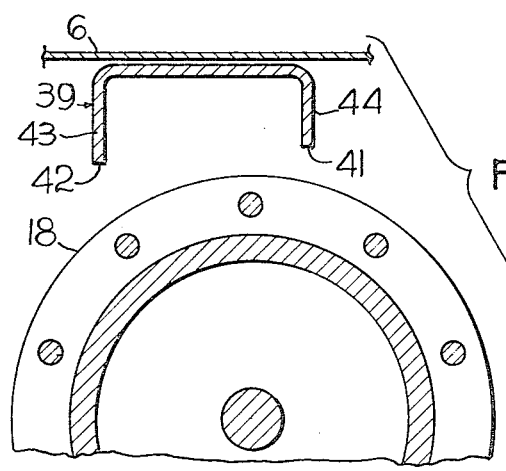
FIG. 3 is a cross-section view taken on line III—III of FIG. 2.
Figure 4:
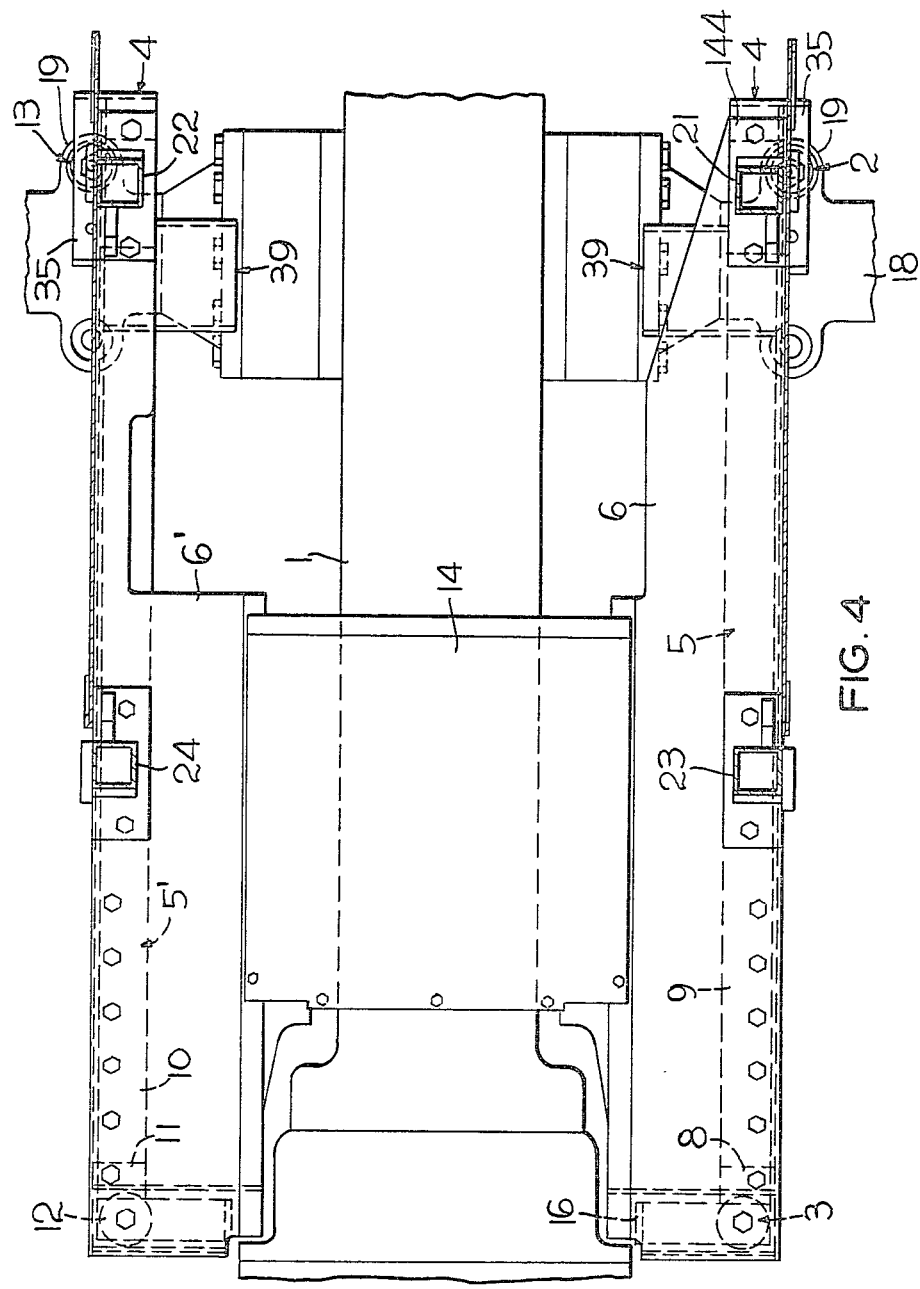
FIG. 4 is a plan view partially in section of the platform and a portion of the protective frame mounted through resilient isolators on the vehicle chassis.

Referring to the drawings the preferred embodiment is illustrated. FIG. 1 shows the vehicle chassis 1 which carrys support brackets 4 and 15 which support the resilient isolators 2 and 3. Isolators support the brackets 4, 8 and beam 5 supporting the plate 6 and protective frame 7. The beams 5 and 5' include plates 6 and 6' fastened to the channels 9 and 10 which extend longitudinally of the side of the body. The isolators 2 and 13 support the opposite sides of the platform. The two channels 9 and 10 support platform 14 which extends along the beams to support the operator at the operator station. FIG. 1 shows a bracket 15 and a bracket 16 supporting the resilient isolator 3 at the front end of the vehicle platform. The rear axle housing 18 is provided with supporting arms 19 both supporting the isolators 2 and 13. This provides a support through isolators for the brackets 4 which are connected to the rear of the beams 9 and 10.

The protective frame 7 includes four upright columns 21, 22, 23 and 24. The columns 21 and 22 are integral and extend overhead as an integral structure. The overhead structure 25 provides a support for the canopy 26 which extends forwardly and is supported by the upright column 23 and the mating column 24 on the opposite side. Suitable fastening means including the bolts 27, 28, 29 and 30 fasten the canopy 26 to the overhead structure formed by the uprights extending under the canopy. The right hand wheel guard 31 is fastened to the uprights 22 and 24 while the left hand wheel guard 32 is fastened to the uprights 21 and 23. The wheel guards are also fastened to the sidebeams and platform at the base of the wheelguards.

The rear of the platform is supported by a bracket 35 that extends downwardly and forwardly where it is connected to the resilient isolator 2. The resilient isolator fastens above and below the horizontal portion 36. The resilient isolator is supported on the supporting arm 19 extending from the rear drive housing 18. Symetrical structures support the rear portion of the platform on either side of the vehicle. An additional bracket 39 of an inverted U-shaped construction extends underneath the platform and inboard to a point in spaced relation to the rear drive housing 18. A space is provided under the facings 41 and 42 of the upright portions 43 and 44 of the bracket 39. This allows limited movement of the bracket 39 before it engages the rear axle housing in case the protective frame is deformed because of a vehicle upset. The base 144 is bolted to the channel 5 and bracket 35 to form a rigid support for the upright 21. Accordingly, the beam structure of beam 9 fastened to the brackets 35 and bracket 39 provides a rigid supporting structure for the platform as well as the protective frame. In the event of upset the structure will provide some deformation and then engage the vehicle chassis to prevent failure and injury to the operator.

The device operates in the following described manner:

The base of the protective frame 7 is securely fastened to the platform and side beams 9 and 10. The side beams 9 and 10 are also securely fastened to the brackets 35 and 39 which are positioned on both sides of the rear of the vehicle. Normally, the protective frame is constructed such that the operator has adequate room for normal operation of the vehicle. The base structure which is firmly supported with the platform and resiliently mounted on the vehicle chassis is permitted a limited degree of deformation to absorb heavy shock and side loading in event of vehicle upset. The sideloading will cause the bracket 39 to shift toward the final drive housing 18 and then engage a portion of the housing to lockout and prevent further deformation. The protective frame will be prevented from failing due to the deformation permitted and the lockout engagement with the final drive housing to assure the safety of the operator at the operator station.

The embodiments of the invention in which an exclusive property or privilege is claimed are defined as follows:

1. A vehicle having a protective frame over the operator station comprising, a vehicle chassis, a platform resiliently mounted on said vehicle chassis including resilient isolators mounted on said vehicle chassis resiliently supporting said platform, a protective frame mounted on said platform, a secondary support structure for said protective frame including a bracket fastened to a base of said protective frame and extending inwardly from the base, means on said bracket positioned in a predetermined spaced relation to said chassis for engagement with said chassis in the event of excessive side loading of the protective frame causing deformation and shifting of the protective frame and thereby provide a firm support for the protective frame to assure that the protective frame will not fail and to assure safety of the operator.

2. A vehicle having a protective frame over the operator station as set forth in claim 1 including a canopy mounted on top of said protected frame.

3. A vehicle having a protective frame over the operator station as set forth in claim 1 therein said protective frame defines four upright columns defining a front and rear pair of columns, overhead integrally connecting means connecting the front pair of columns and connecting the rear pair of said columns.

4. A vehicle having a protective frame over the operator station as set forth in claim 1 including a wheel guard on each side of said vehicle connected to said protective frame.

5. A vehicle having a protective frame over the operator station as set forth in claim 1 wherein said protective frame includes four upright columns, a canopy connecting to the upper part of four upright columns providing an integral structure.

6. A vehicle having a protective frame over the operator station as set forth in claim 1 wherein, said protective frame includes four upright columns positioned around the operator station, means defining laterally offset portions of said upright columns for providing clearance around the operator at the operator station.

7. A vehicle having a protective frame over the operator station as set forth in claim 1 wherein a fore and aft vertical cross-sectional plane through said bracketing defines an inverted U-shaped structure of said bracket fastened to the base of said protective frame.

8. A vehicle having a protective frame over the operator station as set forth in claim 1 including, bracket means for carrying said platform, a support on said vehicle chassis, resilient isolators mounted on said support carrying said bracket means and resiliently supporting said platform, said secondary support structure including a secondary support bracket firmly secured to the base of said upright columns, said secondary support brackets define rigid structure extending for engagement of said chassis, said chassis defining a transmission housing spaced from said brackets for engaging and providing a firm support for said protective frame in the event of vehicle upset.

9. A vehicle having a protective frame over the operator station as set forth in claim 1 wherein, said platform includes side beams, said secondary support includes a bracket defining a horizontal portion firmly fastened to each of said side beams and the base of said upright column, said secondary support bracket defining vertical walls extending inwardly, said chassis defines a rear axle housing, said vertical walls engaging said rear drive housing when said vehicle protective frame is defomed to provide firm support for the protective frame.

* * * * *